A. KIMBLE.
DYNAMO ELECTRIC MACHINE.
APPLICATION FILED MAR. 19, 1919.
1,345,370. Patented July 6, 1920.
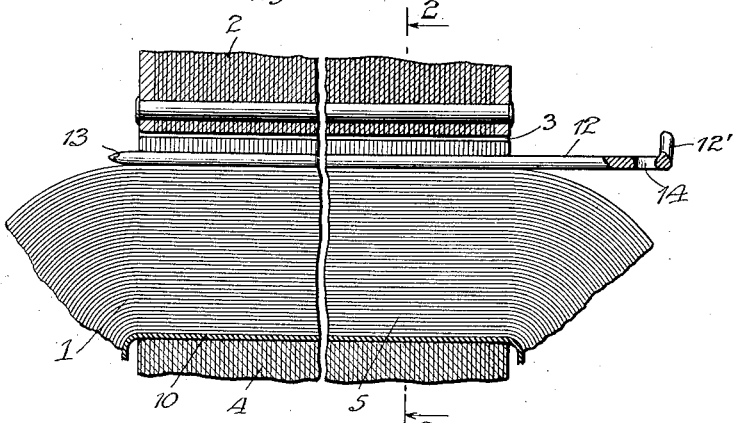
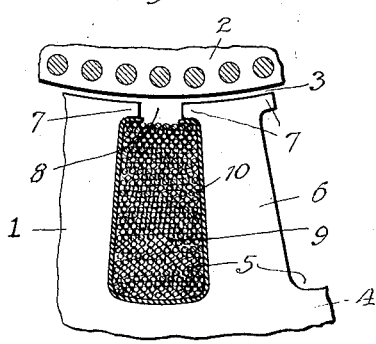
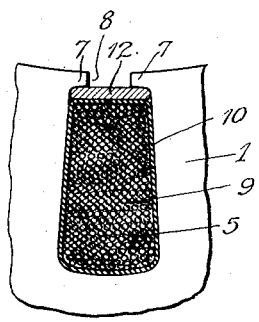
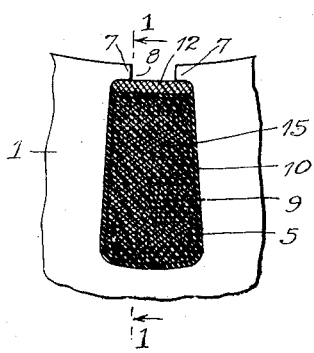
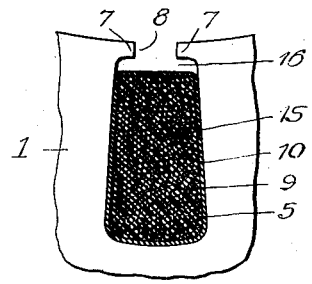
Witnesses:
Martin N. Olsen
Fred M. Davis
Inventor:
Austin Kimble,
By Rummler & Rummler
Attys

UNITED STATES PATENT OFFICE.

AUSTIN KIMBLE, OF WAUSAU, WISCONSIN, ASSIGNOR TO MARATHON ELECTRIC & MANUFACTURING CO., OF WAUSAU, WISCONSIN.

DYNAMO-ELECTRIC MACHINE.

1,345,370.   Specification of Letters Patent.   Patented July 6, 1920.

Application filed March 19, 1919. Serial No. 283,554.

*To all whom it may concern:*

Be it known that I, AUSTIN KIMBLE, a citizen of the United States of America, and a resident of Wausau, county of Marathon, and State of Wisconsin, have invented certain new and useful Improvements in Dynamo-Electric Machines, of which the following is a specification.

This invention relates to dynamo-electric machines having electro-magnetic cores provided with slots in their faces to receive the current coils, and more particularly to ventilating features and to means for securing the windings in place. The invention relates especially to fan-ventilated induction motors of the general type shown in my United States Patent No. 1,318,453, dated Oct. 14, 1919.

The main objects of the invention are to provide more draft-way adjacent to the windings, without changing the design of the slots or coils or increasing the air gap between the stator and rotor members; to provide for securing the windings rigidly in place in the slots without the use of wedges or other interposed means; and to provide improved methods and means for accomplishing these objects.

An illustrative embodiment of this invention is shown by the accompanying drawings, in which—

Figure 1 is a fragmentary radial axial section through the adjacent parts of the stator and rotor on the line 1—1 of Fig. 4.

Fig. 2 is a detailed sectional view through one of the stator slots and adjacent members on the line 2—2 of Fig. 1, except that the conductors are shown as filling the slot before the retaining wedge is inserted.

Fig. 3 is substantially similar to Fig. 2, except that the retaining wedge is shown in place with the conductors correspondingly compressed.

Fig. 4 shows the slot substantially as in Fig. 3 after having been impregnated with a hard setting filler material.

Fig. 5 shows the slot after the filler material has set and the wedge has been removed.

In the specific embodiment shown in the drawings, a sufficient part of a squirrel-cage type of induction motor is shown to illustrate the invention. A part of the slotted stator is represented by the numeral 1, and the adjacent part of the rotor is indicated by the numeral 2, said stator and rotor being separated by a small air gap 3. Said stator includes a laminated core 4 provided with a series of inwardly facing slots 5 and teeth 6 as usual in devices of the character stated, said slots being of the overhung type with flanges or lips 7 disposed toward each other and separated by a narrow mouth 8. Each slot is provided with a coil or winding 9 consisting of a bundle of insulated wires protected from the core laminations by a sheet or layer of insulation 10, which may be of fabric, fiber-board, or other suitable material, as understood in the art.

In Figs. 3 and 4, a key or wedge 12 is shown for securing the coil tightly in place and for holding the outer edges of the insulation folded over closely against the outer side of the coil. Said key is rounded or somewhat pointed at end 13 to facilitate insertion lengthwise between the flanges 7 and the coil 9. The opposite end of the key is formed with a transverse bearing part adapted to receive the application of such force as may be necessary to withdraw the key when the windings have become set as hereinafter explained. For this purpose, the key is bent at 12′ so as to facilitate engagement by a suitable tool, not shown. It may to advantage also be perforated at 14. In order that the coil and insulation may ultimately remain fixed and rigid in their normal position, independently of the key 12, they are impregnated with a hard-setting material such as asphalt-paint or enamel, as shown at 15 in Figs. 4 and 5.

Referring to Fig. 5, it will be seen that when the key 12 is withdrawn, there remains an open passageway or flue 16 back of the tooth flanges 7, adapted to facilitate ventilation and access of the cooling draft directly to a large core area, as well as to the winding. By this means I am able to utilize the space formerly occupied by the permanent slot-wedges or keys for increasing ventilation and raising efficiency.

The method of winding and finishing a slotted core device embodying this invention may be carried out in accordance with the following sequence: First, the laminated core being assembled, the layer of insulation 10 is applied to the interior of the slot. The coil or windings 9 are then applied in any manner desired, either by hand, or by machine if the apparatus is adapted for automatic winding. The form which I prefer is known as a "skein" winding. After the winding is in place, the outer edges of the insulation 10 are folded over tightly and brought together or overlapped to inclose the coil, substantially as shown in Figs. 3, 4, and 5. The wedge or key 12 is then slipped into place by an endwise thrust (toward the left in Fig. 1) whereupon the coil is ready for the paint. As soon as all of the windings are in place and properly keyed, the core with its windings is heated to about 300° F., whereby all moisture is expelled, and it is then dipped in cold paint, where it is permitted to stand for about twenty-five or thirty minutes. It is then removed from the paint and permitted to drip for about two hours. The device is then placed in a drying oven and baked for about five and one-half hours at a temperature of approximately 350° F. It is then removed from the oven and permitted to cool for about two hours, whereupon the keys are withdrawn, the cores still being somewhat hot, but much cooler than when removed from the oven. At the time when the keys are withdrawn, the paint, though not hardened enough about them to prevent their ready withdrawal, has sufficiently set in and about the windings and insulation to hold the latter parts rigidly in place without any give or yielding whatever, even without the support of the keys. Owing to this treatment, the cores have a black enamel-like appearance when finished, and the blank key apertures furnish a most effective draft passageway for ventilation when the apparatus is assembled ready for use. The draft of air surrounding the teeth heads quickly removes the heat incident to the tooth iron losses, as well as the heat generated in the coils.

As a result of the highly efficient air draft cooling obtainable by the foregoing construction, it is practicable to greatly increase the current density in the windings and to reduce the weight of copper accordingly. Moreover, I have found by tests that a motor constructed as herein described will run about 20° F. cooler than a corresponding motor operated without removal of the keys.

This improvement is especially adapted for advantageous use for small alternating current motors ranging in size from about one-eighth to one-quarter horse power, such as are used extensively for instance on washing machines.

Although but one specific embodiment of this invention is herein shown and described, it will be understood that numerous details of the construction shown may be altered or omitted without departing from the spirit of this invention as defined by the following claims.

I claim:

1. The method of providing an air passageway through a core slot adjacent to the teeth and windings, which consists in placing a key in the slot parallel with the windings in tight-fitting relation thereto, and in engagement with the adjacent teeth for securing the windings initially, applying a hard setting material to the windings, and then removing the key after the material has set.

2. The method of providing an air passageway through a core slot in intimate cooling relation to the windings, which consists in placing a straight longitudinally removable member in the slot with the windings in tight-fitting relation thereto, treating the windings with a more or less fluid material adapted for hardening when subjected to heat, baking the device thus prepared, and then removing said member.

Signed at Wausau, this 15th day of March, 1919.

AUSTIN KIMBLE.